United States Patent
Foucher (10) Patent No.: US 10,399,387 B2
(45) Date of Patent: Sep. 3, 2019

(54) TIRE COMPRISING VARIABLE THICKNESSES OF THE RUBBER MIXTURES INSIDE THE CARCASS REINFORCEMENT

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventor: Benoît Foucher, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 518 days.

(21) Appl. No.: 14/904,664

(22) PCT Filed: Jul. 9, 2014

(86) PCT No.: PCT/EP2014/064762
§ 371 (c)(1),
(2) Date: Jan. 12, 2016

(87) PCT Pub. No.: WO2015/004210
PCT Pub. Date: Jan. 15, 2015

(65) Prior Publication Data
US 2016/0152081 A1 Jun. 2, 2016

(30) Foreign Application Priority Data

Jul. 12, 2013 (FR) .................................... 13 56860

(51) Int. Cl.
*B60C 5/14* (2006.01)
*B60C 9/20* (2006.01)
(Continued)

(52) U.S. Cl.
CPC .............. *B60C 9/20* (2013.01); *B60C 1/0041* (2013.01); *B60C 5/14* (2013.01); *B60C 9/2006* (2013.01);
(Continued)

(58) Field of Classification Search
CPC .... B60C 5/14; B60C 9/18; B60C 9/20; B60C 9/22; B60C 9/2204; B60C 2009/2012; B60C 2009/2038; B60C 2009/2219
See application file for complete search history.

(56) References Cited

U.S. PATENT DOCUMENTS 3,495,645 A * 2/1970 Gough .................... B60C 5/142
152/454
4,305,446 A 12/1981 Brown et al.
(Continued)

FOREIGN PATENT DOCUMENTS

DE 3202039 * 7/1983
FR 2 728 510 12/1994
(Continued)

OTHER PUBLICATIONS

Machine translation of JP 04031107, 1992.*

*Primary Examiner* — Justin R Fischer
(74) *Attorney, Agent, or Firm* — Cozen O'Connor (57) ABSTRACT

A tire comprises two working crown layers of reinforcing elements and, in each shoulder, an end of a layer of parallel reinforcing elements oriented circumferentially, said end being axially outside the working crown layers. The reinforcing elements have a diameter less than 1 mm and comprise threads with a diameter strictly greater than 0.16 mm, and, in a radial plane, the ratio between the thicknesses of rubber compound between the inner surface of the tire cavity and that point of a metal reinforcing element of the carcass reinforcement that is closest to said inner surface of the cavity, of the two parts of the tire profile that are centered (Continued)

on the respective orthogonal projections onto the inner surface of the tire cavity of the axially outer ends of said additional layers, and of the parts of the tire profile that have the smallest thicknesses, being greater than 1.15.

8 Claims, 3 Drawing Sheets

(51) Int. Cl.
*B60C 1/00* (2006.01)
*B60C 9/02* (2006.01)
*B60C 9/22* (2006.01)
*B60C 9/04* (2006.01)

(52) U.S. Cl.
CPC ............... *B60C 2009/0284* (2013.01); *B60C 2009/0425* (2013.01); *B60C 2009/208* (2013.01); *B60C 2009/2016* (2013.01); *B60C 2009/2019* (2013.01); *B60C 2009/2022* (2013.01); *B60C 2009/2038* (2013.01); *B60C 2009/2041* (2013.01); *B60C 2009/2219* (2013.01); *B60C 2009/2261* (2013.01); *B60C 2200/06* (2013.01)

(56) References Cited

U.S. PATENT DOCUMENTS

| 6,530,410 | B1 * | 3/2003 | Obana | B60C 9/0007 |
| | | | | 152/451 |
| 2009/0139628 | A1 * | 6/2009 | Coue | B60C 9/2006 |
| | | | | 152/532 |

FOREIGN PATENT DOCUMENTS

| FR | 2 950 838 | | 4/2011 |
| JP | 04031107 | * | 2/1992 |
| JP | 2002-363875 | * | 12/2002 |
| JP | 2004-36027 | * | 2/2004 |
| WO | WO 99/24269 | | 5/1999 |
| WO | WO 2007/003548 | | 1/2007 |

* cited by examiner

TIRE COMPRISING VARIABLE THICKNESSES OF THE RUBBER MIXTURES INSIDE THE CARCASS REINFORCEMENT

RELATED APPLICATIONS

This is a U.S. National Phase Application under 35 USC 371 of International Application PCT/EP2014/064762 filed on Jul. 9, 2014.

This application claims the priority of French application no. 13/56860 filed Jul. 12, 2013, the entire content of which is hereby incorporated by reference.

FIELD OF THE INVENTION

The present invention relates to a tire having a radial carcass reinforcement, and more particularly a tire intended for fitting to vehicles that carry heavy loads, such as lorries, tractors, trailers or buses, for example.

BACKGROUND OF THE INVENTION

In the tires of heavy goods vehicles, the carcass reinforcement is generally anchored on either side in the area of the bead and is surmounted radially by a crown reinforcement made up of at least two layers that are superimposed and formed of threads or cords which are parallel in each layer and crossed from one layer to the next, forming angles of between 10° and 45° with the circumferential direction. Said working layers that form the working reinforcement may be further covered by at least one layer, referred to as the protective layer, formed by reinforcing elements which are advantageously metallic and extensible and are referred to as elastic reinforcing elements. It may also comprise a layer of metal threads or cords having low extensibility that form an angle of between 45° and 90° with the circumferential direction, this layer, referred to as the triangulation layer, being radially located between the carcass reinforcement and the first crown layer, referred to as the working layer, that is formed by parallel threads or cords lying at angles not exceeding 45° in absolute terms. The triangulation layer forms a triangulated reinforcement with at least said working layer, this reinforcement having low deformation under the various stresses which it undergoes, the triangulation layer essentially serving to absorb the transverse compressive forces that act on all the reinforcing elements in the crown area of the tire.

Cords are said to be inextensible when said cords exhibit, under a tensile force equal to 10% of the breaking force, a relative elongation at most equal to 0.2%.

Cords are said to be elastic when said cords exhibit, under a tensile force equal to the breaking load, a relative elongation at least equal to 3% with a maximum tangent modulus of less than 150 GPa.

Circumferential reinforcing elements are reinforcing elements which form angles with the circumferential direction in the range +2.5°, −2.5° around 0°.

The circumferential direction of the tire, or longitudinal direction, is the direction that corresponds to the periphery of the tire and is defined by the direction in which the tire runs.

The transverse or axial direction of the tire is parallel to the axis of rotation of the tire.

The radial direction is a direction that intersects the axis of rotation of the tire and is perpendicular thereto.

The axis of rotation of the tire is the axis about which it turns in normal use.

A radial or meridian plane is a plane which contains the axis of rotation of the tire.

The circumferential mid-plane, or equatorial plane, is a plane which is perpendicular to the axis of rotation of the tire and divides the tire into two halves.

For metal wires or cords, force at break (maximum load in N), breaking strength (in MPa) and elongation at break (total elongation in %) are measured under tension in accordance with standard ISO 6892, 1984.

Certain present-day tires, referred to as "road tires", are intended to run at high average speeds and over increasingly long journeys, because of improvements to the road network and the growth of motorway networks worldwide. The combined conditions under which such a tire is called upon to run without any doubt make possible an increase in the number of miles travelled, the wear on the tire being reduced. This increase in life in terms of milage, combined with the fact that such conditions of use are likely, under heavy load, to result in relatively high crown temperatures, dictates the need for an at least proportional increase in the durability of the crown reinforcement of the tires.

This is because stresses are present in the crown reinforcement; more particularly, there are shear stresses between the crown layers which, in the case of an excessive rise in the operating temperature at the ends of the axially shortest crown layer, result in the appearance and propagation of cracks in the rubber at said ends. The same problem exists in the case of edges of two layers of reinforcing elements, said other layer not necessarily being radially adjacent to the first layer.

In order to improve the endurance of the crown reinforcement of the tires, the French application FR 2 728 510 proposes arranging, on the one hand, between the carcass reinforcement and the crown reinforcement working ply that is radially closest to the axis of rotation, an axially continuous ply which is formed of inextensible metal cords that form an angle at least equal to 60° with the circumferential direction and of which the axial width is at least equal to the axial width of the shortest working crown ply and, on the other hand, between the two working crown plies, an additional ply formed of metal elements that are oriented substantially parallel to the circumferential direction.

In addition, the French application WO 99/24269 notably proposes, on each side of the equatorial plane and in the immediate axial continuation of the additional ply of reinforcing elements substantially parallel to the circumferential direction, that the two working crown plies formed of reinforcing elements crossed from one ply to the next be coupled over a certain axial distance and then uncoupled using profiled elements of rubber compound over at least the remainder of the width that said two working plies have in common.

The layer of circumferential reinforcing elements is usually formed by at least one metal cord wound to form a turn of which the angle of lay with respect to the circumferential direction is less than 8°. The cords initially manufactured are coated with a rubber compound before being laid. This rubber compound will then penetrate the cord under the effect of the pressure and temperature during the curing of the tire.

The document WO 07/003548 further proposes a crown reinforcement comprising, in each shoulder, at least one layer of reinforcing elements that are mutually parallel in the layer and are oriented circumferentially.

The results obtained with these types of embodiment are frequently satisfactory in terms of endurance and wear in the case of prolonged road running at high speed. However, it would seem that, under certain running conditions, notably in the case of overload, certain tires sometimes exhibit weaknesses in terms of endurance of the crown reinforcement.

SUMMARY OF THE INVENTION

One object of the invention is to provide tires for "heavy goods" vehicles in which the performance in terms of endurance and wear is retained, or improved, for road use, whatever the conditions of use.

This object is achieved according to one aspect of the invention by a tire having a radial carcass reinforcement comprising a crown reinforcement formed of at least two working crown layers of reinforcing elements that are crossed from one layer to another, forming angles of between 10° and 45° with the circumferential direction, said crown reinforcement itself being capped radially with a tread, said tread being joined to two beads by way of two sidewalls, said tire additionally comprising, in each shoulder, at least one end of a layer of reinforcing elements that are mutually parallel in the layer and are oriented circumferentially, said end of said additional layer of reinforcing elements that are mutually parallel in the layer and are oriented circumferentially being axially outside said at least two working crown layers, the reinforcing elements of the carcass reinforcement having a diameter less than 1 mm and being made up of threads with a diameter strictly greater than 0.16 mm, and, in a radial plane, the ratio between the thicknesses of rubber compound between the inner surface of the tire cavity and that point of a metal reinforcing element of the carcass reinforcement that is closest to said inner surface of the cavity, of the two parts of the tire profile that are centred on the respective orthogonal projections onto the inner surface of the tire cavity of the axially outer ends of said additional layers of reinforcing elements that are mutually parallel in the layer and are oriented circumferentially, and of the parts of the tire profile that have the smallest thicknesses, being greater than 1.15.

Advantageously, according to an embodiment of the invention, the reinforcing elements of the carcass reinforcement are made up of threads with a diameter less than 0.20 mm.

Within the meaning of the invention, the fact that an end of said additional layer of reinforcing elements that are mutually parallel in the layer and are oriented circumferentially is axially outside said at least two working crown layers means that said end is axially outside the ends of said at least two working crown layers and/or axially outside all points of said at least two working crown layers.

Within the meaning of the invention, elements that are mutually parallel in the layer and are oriented circumferentially can be rectilinear reinforcing elements or reinforcing elements that are oriented mainly in a circumferential direction and undulate about this main direction.

Also preferably, the reinforcing elements of the additional layers of reinforcing elements that are mutually parallel in the layer and oriented circumferentially are metal cords.

Also within the meaning of the invention, the additional layers may be layers that are continuous across the entire width, or interrupted layers, such as narrow plies placed on the shoulders.

Said additional layers may also, within the meaning of the invention, be positioned radially inside said at least two working crown layers, radially outside said at least two working crown layers, or between said at least two working crown layers.

Advantageously, according to an embodiment of the invention, when the additional layers are discontinuous, the axially inner ends of each of said additional layers are radially adjacent to the edge of a working crown layer.

The thickness of rubber compound between the inner surface of the tire cavity and that point of a reinforcing element that is closest to said surface is equal to the length of the orthogonal projection onto the inner surface of the tire cavity of the end of that point of a reinforcing element that is closest to said surface.

The measurements of the thickness of rubber compound are carried out on a cross section of a tire, the tire thus being in a non-inflated state.

The tires according to embodiments of the invention effectively have improved performance in terms of endurance notably as far as the change in the polymeric masses surrounding the ends of the crown reinforcement is concerned on account notably of the presence at least in each shoulder of at least one layer of reinforcing elements that are mutually parallel in the layer and oriented circumferentially.

Moreover, the inventors have been able to show that the increase in the circumferential rigidity due to the presence in each shoulder of at least one layer of reinforcing elements that are mutually parallel in the layer and oriented circumferentially makes it possible to maintain even wear notably when running under overload.

Furthermore, the inventors have been able to show that, in each shoulder, the axially outer end of said additional layer of reinforcing elements that are mutually parallel in the layer and oriented circumferentially locally provides circumferential rigidity forming a characteristic point in every meridian plane of the tire. Notably when running under overload, this characteristic point can result in cyclical deformations of the carcass reinforcement, leading to unacceptable fatigue of the reinforcing elements of the carcass reinforcement. Reinforcing elements of the carcass reinforcement that have a diameter less than 1 mm, said reinforcing elements being made up of threads with a diameter strictly greater than 0.16 mm and preferably less than or equal to 0.20 mm, said threads being associated, in accordance with the invention, with variations in the thickness of the wall forming the tire cavity, appear to make it possible for the tire to withstand the cyclical stresses generated on account of the presence of said additional layer of reinforcing elements that are mutually parallel in the layer and oriented circumferentially, without any sign of fatigue of said reinforcing elements of the carcass reinforcement appearing, including when running under overload.

Specifically, according to an embodiment of the invention, the two parts of the tire profile, opposite the axially outer ends of said additional layers, have overthicknesses of rubber compound between the inner surface of the tire cavity and that point of a metal reinforcing element of the carcass reinforcement that is closest to said inner surface of the cavity.

The presence of these overthicknesses makes it locally possible to brake the passage of the inflation air in the direction of the reinforcing elements of the carcass reinforcement and to limit the wear to said cyclically stressed reinforcing elements, the presence of the oxygen accentuating these fatigue phenomena.

Moreover, it appears that the presence of these overthicknesses increases the rigidity of these regions of the tire and can help to limit the abovementioned cyclical deformations and can thus help to improve the performance in terms of endurance.

These overthicknesses can be obtained in various ways while the tire is being manufactured. A first method consists in producing the layer of rubber compound that forms the wall of the tire cavity with the desired profile to form these overthicknesses. Since this compound usually forms the sealing layer of the tire, the regions of overthicknesses constitute an even better barrier to the passage of the inflation air. Another method consists in producing these regions of overthicknesses by locally adding additional layers of rubber compounds; it is then possible to choose a material similar to the one that forms the wall of the tire cavity in order to safely contribute to the sealing function, or a material having different properties, notably greater rigidity for increasing the rigidity of these regions.

According to a preferred embodiment of the invention, the thicknesses of the rubber compound between the inner surface of the tire cavity and that point of a metal reinforcing element of the carcass reinforcement that is closest to said inner surface of the cavity, of said two parts of the tire profile that are centered on the respective orthogonal projections of the axially outer ends of said additional layers, are greater than 3.5 mm and more preferably greater than 4 mm.

Advantageously, according to an embodiment of the invention, the meridian lengths of said parts of the tire profile of which the thicknesses of rubber compound between the inner surface of the tire cavity and that point of a metal reinforcing element of the carcass reinforcement that is closest to said inner surface of the cavity are greater, are between 10 and 40 mm.

The results obtained with the tires according to embodiments of the invention have thus shown that they maintain satisfactory endurance and wear properties when running, whatever the conditions and notably in the event of overload. In the same way, it would seem that the tires according to the invention that are used under conditions of reduced inflation pressure exhibit quite satisfactory performance in terms of wear and endurance.

According to a preferred embodiment of the invention, the reinforcing elements of at least one layer of the carcass reinforcement are metal cords that return a flow rate less than 20 $cm^3$/min in what is referred to as the permeability test.

The test referred to as the permeability test makes it possible to determine the longitudinal permeability to air of the cords tested, by measuring the volume of air passing along a test specimen under constant pressure for a given period of time. The principle of such a test, which is well known to a person skilled in the art, is to demonstrate the effectiveness of the treatment of a cord to make it impermeable to air; it has been described for example in standard ASTM D2692-98.

The test is carried out on cords extracted directly, by stripping, from the vulcanized rubber plies which they reinforce, thus penetrated by the cured rubber.

The test is carried out on 2 cm length of cord, which is therefore coated with its surrounding rubber compound (or coating rubber) in the cured state, in the following way: air is injected into the inlet end of the cord at a pressure of 1 bar and the volume of air at the outlet end is measured using a flow meter (calibrated for example from 0 to 500 $cm^3$/min). During the measurement, the sample of cord is immobilized in a compressed airtight seal (for example, a seal made of dense foam or of rubber) so that only the amount of air passing along the cord from one end to the other, along its longitudinal axis, is taken into account by the measurement; the airtightness of the airtight seal itself is checked beforehand using a solid rubber test specimen, that is to say one without a cord.

The higher the longitudinal impermeability of the cord, the lower the mean air flow rate measured (averaged over 10 specimens). Since the measurement is carried out with an accuracy of ±0.2 $cm^3$/min, measured values of less than or equal to 0.2 $cm^3$/min are regarded as zeros; they correspond to a cord which can be described as airtight (completely airtight) along its axis (i.e. in its longitudinal direction).

This permeability test also constitutes a simple means of indirect measurement of the degree of penetration of the cord by a rubber composition. The lower the flow rate measured, the greater the degree of penetration of the cord by the rubber.

Cords which return a flow rate of less than 20 $cm^3$/min in what is referred to as the permeability test have a level of penetration greater than 66%.

The degree of penetration of a cord can also be estimated according to the method described below. In the case of a layered cord, the method consists, in a first step, in removing the outer layer from a sample with a length of between 2 and 4 cm in order to subsequently measure, in a longitudinal direction and along a given axis, the sum of the lengths of rubber compound with respect to the length of the sample. These measurements of lengths of rubber compound exclude the spaces not penetrated along this longitudinal axis. These measurements are repeated along three longitudinal axes distributed over the periphery of the sample and are repeated on five samples of cords.

When the cord comprises several layers, the first step of removal is repeated with what is now the outer layer and the measurements of lengths of rubber compound along longitudinal axes.

A mean of all the ratios of lengths of rubber compound to the lengths of samples thus determined is then calculated in order to define the degree of penetration of the cord.

The cords of the carcass reinforcement which are subject to fatigue phenomena, thus defined according to this preferred embodiment of the invention, may offer better resistance to these wear and fatigue phenomena on account of their degree of penetration with the rubber compounds and thus help to improve the endurance of the tire notably when used under extreme conditions.

According to an advantageous variant of the invention, the metal reinforcing elements of at least one layer of the carcass reinforcement are cords comprising at least two layers, at least one inner layer being sheathed with a layer consisting of a polymer composition, such as a non-crosslinkable, crosslinkable or crosslinked rubber composition, preferably based on at least one diene elastomer.

Cords referred to as "layered" cords or "multilayered" cords are cords made up of a central nucleus and of one or more practically concentric layers of strands or threads arranged around this central nucleus.

According to a preferred embodiment of the invention, the cords of the carcass reinforcement return a flow rate of less than 10 $cm^3$/min and more preferably of less than 2 $cm^3$/min in what is referred to as the permeability test.

Within the meaning of the invention, cords that comprise at least two layers, wherein at least one inner layer is sheathed with a layer consisting of a polymer composition, return a flow rate of less than 20 $cm^3$/min and advantageously of less than 2 $cm^3$/min in what is referred to as the permeability test.

The expression "composition based on at least one diene elastomer" is understood to mean, in a known way, that the composition predominantly comprises (i.e. in a fraction of more than 50% by weight) this or these diene elastomers.

It should be noted that the sheath according to embodiments of the invention extends continuously around the layer that it covers (that is to say that this sheath is continuous in the "orthoradial" direction of the cord which is perpendicular to its radius), so as to form a continuous sleeve having a cross section which is advantageously practically circular.

It should also be noted that the rubber composition of this sheath can be crosslinkable or crosslinked, that is to say that it comprises, by definition, a suitable crosslinking system for allowing the crosslinking of the composition during the curing thereof (i.e., the hardening thereof and not the melting thereof); thus, this rubber composition can be described as non-meltable, owing to the fact that it cannot be melted by heating, regardless of the temperature.

The term "diene" elastomer or rubber is understood to mean, in a known way, an elastomer which is based, at least partially (i.e. a homopolymer or a copolymer), on diene monomers (monomers bearing two conjugated or non-conjugated carbon-carbon double bonds).

Preferably, the system for crosslinking the rubber sheath is what is referred to as a vulcanization system, i.e. one based on sulphur (or on a sulphur donor) and a primary vulcanization accelerator. This basic vulcanization system may be supplemented with various known secondary accelerators or vulcanization activators.

The rubber composition of the sheath according to an embodiment of the invention may comprise, in addition to said crosslinking system, all the customary ingredients that can be used in rubber compositions for tires, such as reinforcing fillers based on carbon black and/or an inorganic reinforcing filler such as silica, anti-ageing agents, for example antioxidants, extending oils, plasticizers or agents facilitating the use of the compositions in the green state, methylene acceptors and donors, resins, bismaleimides, known adhesion promoters of the RFS (resorcinol/formaldehyde/silica) type, or metal salts, notably cobalt salts.

Preferably, the composition of this sheath is chosen to be identical to the composition used for the rubber matrix which the cords according to the invention are intended to reinforce. Thus, there is no problem of possible incompatibility between the respective materials of the sheath and the rubber matrix.

According to one variant of the invention, the metal reinforcing elements of at least one layer of the carcass reinforcement are layered metal cords of [L+M] or [L+M+N] construction which can be used as reinforcing element of a tire carcass reinforcement, comprising a first layer C1 having L threads of diameter $d_1$, with L ranging from 1 to 4, which is surrounded by at least one intermediate layer C2 having M threads of diameter $d_2$ that are wound together in a helix at a pitch $p_2$, with M ranging from 3 to 12, said layer C2 optionally being surrounded by an outer layer C3 of N threads of diameter $d_3$ that are wound together in a helix at a pitch $p_3$, with N ranging from 8 to 20, a sheath composed of a non-crosslinkable, crosslinkable or crosslinked rubber composition based on at least one diene elastomer covering said first layer C1 in the construction [L+M] and at least said layer C2 in the construction [L+M+N].

Preferably, the diameter of the threads of the first layer of the internal layer (C1) is between 0.16 and 0.20 mm and the diameter of the threads of the external layers (C2, C3) is between 0.16 and 0.20 mm.

Also preferably, the helical pitch at which said threads of the external layer (C3) are wound is between 8 and 25 mm.

Within the meaning of the invention, the helical pitch represents the length, measured parallel to the axis of the cord, at the end of which a thread that has this pitch makes a complete turn around the axis of the cord; thus, if the axis is sectioned on two planes perpendicular to said axis and separated by a length equal to the pitch of a thread of a layer of which the cord is made up, the axis of this thread has the same position in these two planes on the two circles that correspond to the layer of the thread in question.

Advantageously, the cord has one, and even more preferably all, of the following characteristics:
  the layer C3 is a saturated layer, that is to say that there is not enough room in this layer to add at least one (N+1)th thread of diameter $d_3$, N then representing the maximum number of threads that can be wound in a layer around the layer C2;
  the rubber sheath also covers the internal layer C1 and/or separates the threads in pairs adjacent to the intermediate layer C2;
  the rubber sheath practically covers half the radially inner circumference of each thread of the layer C3, such that it separates the threads in pairs adjacent to this layer C3.

Preferably, the rubber sheath has a mean thickness ranging from 0.010 mm to 0.040 mm.

Generally, the invention can be implemented, in order to form the above-described cords of the carcass reinforcement, with any type of metal threads, in particular made of steel, for example threads made of carbon steel and/or threads made of stainless steel. A carbon steel is preferably used, but it is, of course, possible to use other steels or other alloys.

When a carbon steel is used, its carbon content (% by weight of steel) is preferably between 0.1% and 1.2%, more preferably between 0.4% and 1.0%; these contents represent a good compromise between the mechanical properties required for the tire and the feasibility of the thread. It should be noted that a carbon content between 0.5% and 0.6% ultimately makes such steels less expensive as they are easier to draw. Another advantageous embodiment of the invention may also consist, depending on the intended applications, in using steels with a low carbon content, for example between 0.2% and 0.5%, notably on account of the lower cost and greater ease of drawing.

The cord according to an embodiment of the invention may be obtained by various techniques known to a person skilled in the art, for example in two steps, initially by sheathing the core or intermediate structure L+M (layers C1+C2) via an extrusion head, this step secondly being followed by a final operation in which the remaining N threads (layer C3) are cabled or twisted around the layer C2 thus sheathed. The problem of tackiness in the green state posed by the rubber sheath during any necessary intermediate operations of winding and unwinding may be overcome in a manner known to a person skilled in the art, for example by using an interlayer film of plastics material.

Such cords of at least one carcass reinforcement layer are chosen, for example, from the cords described in patent applications WO 2005/071157, WO 2010/012411, WO 2010/054790 and WO 2010/054791.

In the case notably of interrupted additional layers present at the shoulders of the tire, according to one variant of the invention, the crown reinforcement comprises at least one layer of circumferential reinforcing elements, advantageously between said at least two working crown layers.

According to one advantageous embodiment of the invention, the reinforcing elements of said at least one layer of circumferential reinforcing elements are metal reinforcing elements that have a secant modulus at 0.7% elongation of between 10 and 120 GPa and a maximum tangent modulus of less than 150 GPa.

According to one preferred embodiment, the secant modulus of the reinforcing elements at 0.7% elongation is less than 100 GPa and greater than 20 GPa, preferably between 30 and 90 GPa, and more preferably less than 80 GPa.

Also preferably, the maximum tangent modulus of the reinforcing elements is less than 130 GPa and more preferably less than 120 GPa.

The moduli expressed above are measured on a curve of tensile stress as a function of elongation, the tensile stress corresponding to the tension measured, with a preload of 5 N, with respect to the cross section of metal of the reinforcing element.

According to one preferred embodiment, the reinforcing elements of at least one layer of circumferential reinforcing elements are metal reinforcing elements that have a curve of tensile stress as a function of relative elongation that exhibits shallow gradients for small elongations and a gradient that is substantially constant and steep for greater elongations. Such reinforcing elements of the layer of circumferential reinforcing elements are conventionally known as "bi-modulus" elements.

According to one preferred embodiment of the invention, the substantially constant and steep gradient appears from the point of a relative elongation of between 0.4% and 0.7%.

The various characteristics of the reinforcing elements mentioned above are measured on reinforcing elements taken from tires.

Reinforcing elements that are more particularly suitable for creating at least one layer of circumferential reinforcing elements according to the invention are for example assemblies of construction 3×(0.26+6×0.23) 5.0/7.5 SS. Such a cord has a secant modulus at 0.7% equal to 45 GPa and a maximum tangent modulus equal to 100 GPa, these being measured on a curve of tensile stress as a function of elongation, the tensile stress corresponding to the tension measured, with a preload of 5 N, with respect to the cross section of metal of the reinforcing element, of 0.98 mm² in the case of the example in question.

According to a second embodiment of the invention, the circumferential reinforcing elements may be formed of metal elements cut so as to form portions having a length much less than the circumference of the shortest layer, but preferably greater than 0.1 times said circumference, the cuts between portions being axially offset with respect to one another. More preferably, the modulus of elasticity in tension per unit width of the layer of circumferential reinforcing elements is lower than the modulus of elasticity in tension, measured under the same conditions, of the most extensible working crown layer. Such an embodiment makes it possible in a simple way to give the layer of circumferential reinforcing elements a modulus that can easily be adjusted (by choosing the spacings between portions in one and the same row) but which is in all cases lower than the modulus of the layer which is made up of the same metal elements but in which these elements are continuous, the modulus of the layer of circumferential reinforcing elements being measured on a vulcanized layer of cut elements taken from the tire.

According to a third embodiment of the invention, the circumferential reinforcing elements are wavy metal elements, the ratio a/l of the wave amplitude to the wavelength being at most equal to 0.09. Preferably, the modulus of elasticity in tension per unit width of the layer of circumferential reinforcing elements is lower than the modulus of elasticity in tension, measured under the same conditions, of the most extensible working crown layer.

A preferred embodiment of the invention also provides for the crown reinforcement to be supplemented radially on the outside by at least one additional layer, referred to as a protective layer, of reinforcing elements, referred to as elastic reinforcing elements, that are oriented with respect to the circumferential direction at an angle of between 10° and 45° and in the same direction as the angle formed by the elements of the working layer which is radially adjacent thereto.

According to any one of the embodiments of the invention mentioned hereinabove, the crown reinforcement may be further supplemented, radially on the inside, between the carcass reinforcement and the radially inner working layer that is closest to said carcass reinforcement, by a triangulation layer of metal reinforcing elements made of steel that form, with the circumferential direction, an angle greater than 50° and in the same direction as the angle formed by the reinforcing elements of the layer that is radially closest to the carcass reinforcement.

BREIF DESCRIPTION OF THE DRAWINGS

Further details and advantageous features of the invention will become apparent from the following description of exemplary embodiments of the invention, with reference to FIGS. 1 to 3, in which.

The figures are not shown to scale in order to make them easier to understand. The figures show only a half-view of a tire which continues symmetrically about the axis XX', which represents the circumferential mid-plane, or equatorial plane, of a tire.

DETAILED DESCRIPTION OF THE DRAWINGS

Figure 1:
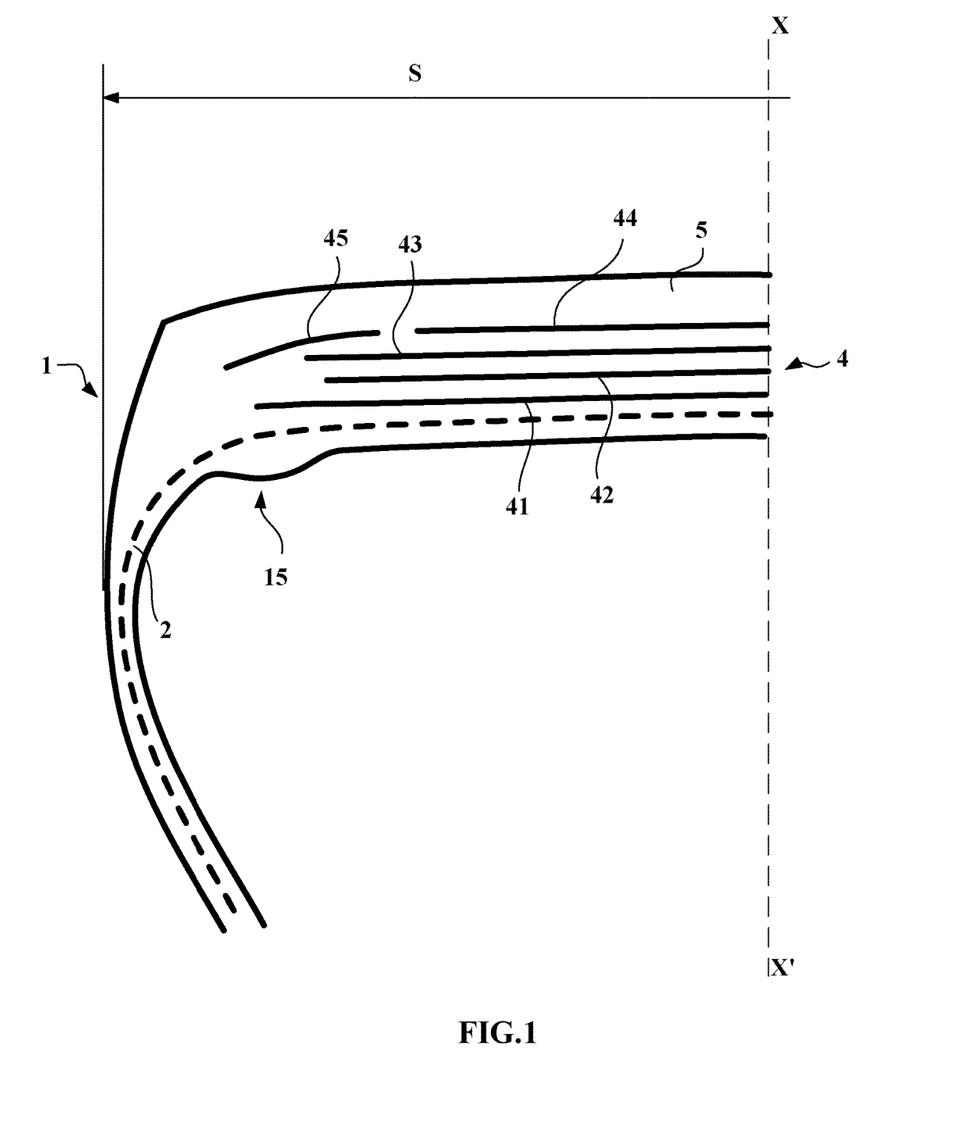
FIG. 1 shows a schematic meridian view of a tire according to one embodiment of the invention.

In FIG. 1, the tire 1, of size 315/70 R 22.5, has an aspect ratio H/S equal to 0.70, H being the height of the tire 1 on its mounting rim and S being its maximum axial width. Said tire 1 comprises a radial carcass reinforcement 2 anchored in two beads, not shown in the figure. The carcass reinforcement is formed by a single layer of metal cords. This carcass reinforcement 2 is wrapped with a crown reinforcement 4, formed radially, from the inside to the outside:

of a first working layer 41 formed of non-wrapped inextensible metal cords of construction 1×0.12+3×0.35+ 8×0.35 7.7/15.4 SS, that form an angle equal to 25° with the circumferential direction at the equatorial plane, of a layer of circumferential reinforcing elements 42 formed of metal cords made of steel of the "bi-modulus" type, of construction 3×(0.26+6×0.23) 5/7.5 SS, of a second working layer 43 formed of non-wrapped inextensible metal cords of construction 1×0.12+3× 0.35+8×0.35 7.7/15.4 SS, that form an angle equal to 25° with the circumferential direction at the equatorial plane and are crossed with the metal cords of the layer 41, of a protective layer 44 formed of elastic metal cords of construction 3×2×0.35 4/6 SS, of an additional layer 45 formed of metal cords of the "bi-modulus" type, of construction 3×(0.26+6×0.23) 5/7.5 SS, that are oriented circumferentially; the layer 45 is radially outside and adjacent to the radially outer working layer 43 and extends axially beyond the axially outer end of the layer 41.

The axial width L41 of the first working layer 41 is equal to 234 mm.

The axial width L42 of the layer of circumferential reinforcing elements 42 is equal to 196 mm.

The axial width L43 of the second working layer 43 is equal to 216 mm.

The additional layer 45 of circumferential reinforcing elements has a width equal to 32 mm; it has a region of axial overlap with the layer 43 equal to 18 mm.

The crown reinforcement is itself capped by a tread 5.

According to this embodiment of the invention shown in FIG. 1, the additional layer is radially outside and adjacent to the working layer 43. According to other embodiments of the invention, the additional layer can be interposed between the working layers, adjacent to one or the other of the working layers 41, 43 or radially inside the radially innermost working layer 41.

As explained above, according to other embodiments of the invention, the additional layer may be continuous in the axial direction of the tire, it being possible, of course, for the layer 42 of circumferential reinforcing elements not to be present.

The layer 42 of circumferential reinforcing elements which contributes towards the endurance performance is also involved in improving notably the wear resistance of the tire on account of the increase in rigidities. It also makes it possible to improve the stability of the crown of the tire during inflation. Moreover, the additional layer 45 advantageously covers the ends of said layer 42 of circumferential reinforcing elements and thus improves the endurance of the circumferential reinforcing elements. The covering width is advantageously greater than four times the spacing of the circumferential reinforcing elements of the layer 42.

According to the embodiment in accordance with FIG. 1, the protective layer 44 is axially interposed between the additional layers 45.

As far as the carcass reinforcement is concerned, according to the invention, the reinforcing elements are metal cords of construction 1×0.20+6×0.18+12×0.18 10/10 ZZ.

Such cords have a diameter equal to 0.95 mm.

According to the invention, the parts of the tire profile, opposite the axially outer ends of the additional layers 45, have overthicknesses 15 of rubber compound between the inner surface of the tire cavity and the carcass reinforcement.

Figure 2:
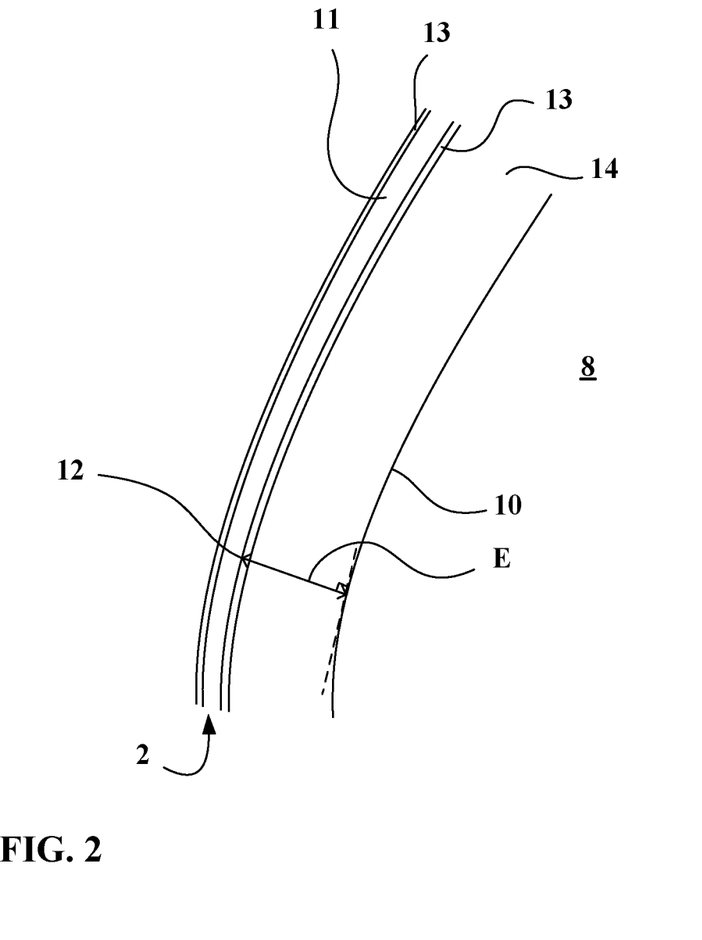
FIG. 2 is an enlarged partial view of a part of the schematic drawing in FIG. 1.

FIG. 2 illustrates an enlarged view of a region of FIG. 1 that does not comprise an overthickness and indicates notably the thickness E of rubber compound between the inner surface 10 of the tire cavity 8 and that point 12 of a reinforcing element 11 that is closest to said surface 10. This thickness E corresponds to a region of the tire in which the thickness of rubber compound is smallest. This thickness E is equal to the length of the orthogonal projection onto the surface 10 of that point 12 of a reinforcing element 11 that is closest to said surface 10. This thickness E is the sum of the thicknesses of the various rubber compounds placed between said reinforcing element 11 of the carcass reinforcement 2; it is both the thickness of the calendering layer 13 radially inside the carcass reinforcement and the thickness of the rubber compound(s) 14 that form the internal wall of the tire 1.

The thickness measurements are carried out on a cross section of the tire, the latter consequently not being fitted or inflated.

The value E measured is equal to 3.6 mm.

Figure 3:
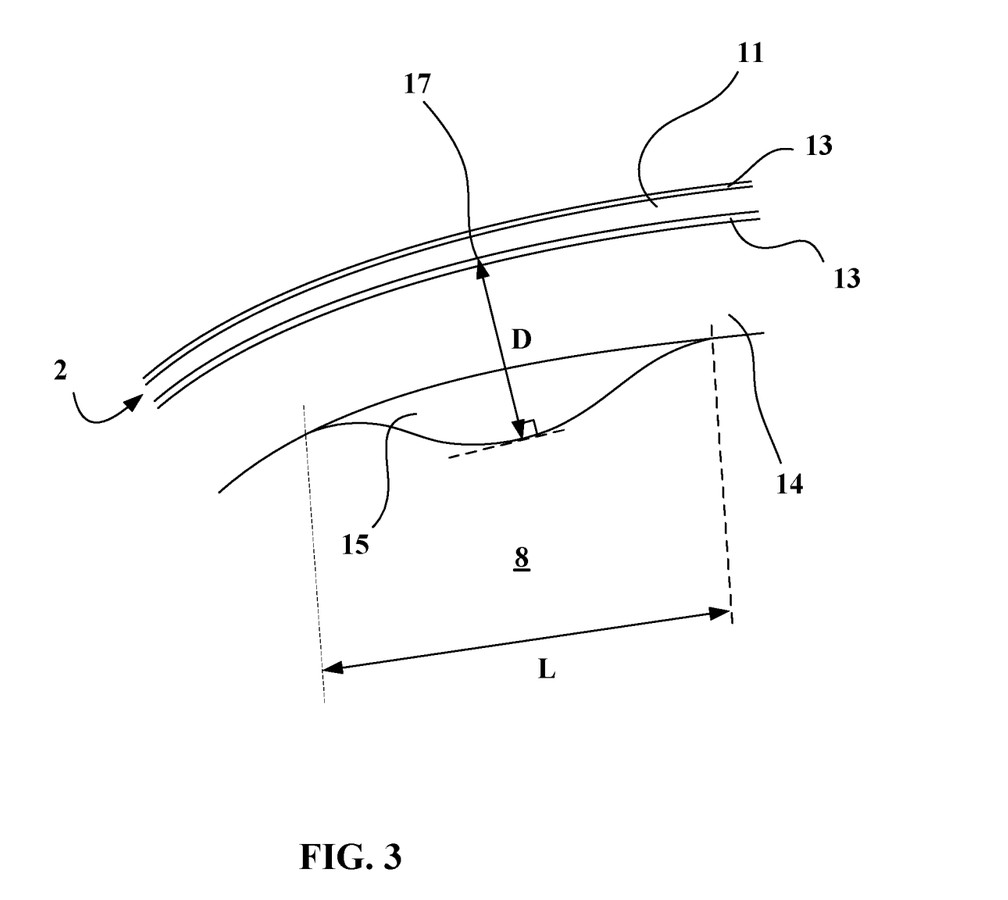
FIG. 3 is an enlarged partial view of another part of the schematic drawing in FIG. 1.

FIG. 3 illustrates a region of FIG. 1 that comprises an overthickness 15 and indicates notably the thickness D of rubber compound between the inner surface 10 of the tire cavity 8 and that point 17 of a reinforcing element 11 that is closest to said surface 10 at the overthickness 15. This thickness D is equal to the length of the orthogonal projection onto the surface 10 of that point 17 of a reinforcing element 11 that is closest to said surface 10, at the location of the greatest thickness at the overthickness 15. This thickness 1( )D is the sum of the thicknesses of the various rubber compounds placed between said reinforcing element 11 of the carcass reinforcement 2; it is both the thickness of the calendering layer 13 radially inside the carcass reinforcement and the thickness of the rubber compound(s) 14 that form the internal wall of the tire 1.

The thickness D at the part 15 is equal to 4.3 mm and thus greater than 4 mm.

The ratio of the thicknesses D to E is equal to 1.20 and thus greater than 1.15.

The length L corresponding to the meridian length of the overthickness 15 is equal to 20 mm and thus between 10 and 40 mm.

Tests were carried out with the tire produced according to the invention, according to the depiction in FIG. 1, and compared with a reference tire of the same size, which comprises the same crown reinforcement, comprises a carcass reinforcement in which the cords are of the formula 1×0.20+6×0.18+12×0.18 10/10 ZZ, and does not comprise the overthicknesses 15 on the internal wall of the tire.

The tests carried out consisted of destructive rolling tests on a dynamometer; this type of test on a dynamometer simulates track tests in a straight line and of long duration.

The test consists of a rolling test on a dynamometer, the tire travelling in a straight line. The load and pressure conditions are the same for the tire according to the invention and the reference tire.

The tire according to the invention covered a distance substantially greater than that covered by the reference tire.

Moreover, the reference tire showed that the deterioration sustained is located at the carcass reinforcement, in the region corresponding to the abovementioned cyclical stresses opposite the axially outer end of the additional layers of reinforcing elements that are mutually parallel in the layer and oriented circumferentially.

The invention claimed is:

1. A tire for a heavy goods vehicle, having
   a radial carcass reinforcement comprising a crown reinforcement formed of at least two working crown layers of reinforcing elements that are crossed from one layer to another, forming angles of between 10° and 45° with the circumferential direction;
   a tread that radially caps the crown reinforcement and is joined to two beads by way of two sidewalls;
   at least one end of a first additional layer of reinforcing elements that are mutually parallel in the layer and are oriented circumferentially in each shoulder,
   wherein said end of said additional layer of reinforcing elements that are mutually parallel in the layer and are oriented circumferentially is axially outside said at least two working crown layers, and wherein the reinforcing elements of the carcass reinforcement have a diameter less than 1 mm, wherein said reinforcing elements of the carcass reinforcement are made up of threads with a diameter strictly greater than 0.16 mm, and wherein, in a radial plane, a ratio between the thicknesses of rubber compound between the inner surface of the tire cavity and that point of a metal reinforcing element of the carcass reinforcement that is closest to said inner surface of the cavity, of the two parts of the tire profile that are centered on the respective orthogonal projections onto the inner surface of the tire cavity of the axially outer ends of said additional layers, and of the parts of the tire profile that have the smallest thicknesses, is greater than 1.15, and the tire further comprising at least one second additional layer, referred to as a protective layer, of reinforcing elements, referred to as elastic reinforcing elements, that is axially interposed between the first additional layers of reinforcing elements, a second end of each respective additional layer being axially in line with the protective layer, wherein the elastic reinforcing elements are oriented with respect to the circumferential direction at an angle of between 10° and 45° and in the same direction as the angle formed by the inextensible elements of the working layer which is radially adjacent thereto.

2. The tire according to claim 1, wherein said reinforcing elements of the carcass reinforcement are made up of threads with a diameter less than or equal to 0.20 mm.

3. The tire according to claim 1, wherein the metal reinforcing elements of at least one layer of the carcass reinforcement are cords, advantageously non-wrapped cords, that return a flow rate less than 20 cm$^3$/min in what is referred to as the permeability test.

4. The tire according to claim 1, wherein the metal reinforcing elements of at least one layer of the carcass reinforcement are cords comprising at least two layers and wherein at least one inner layer is sheathed with a layer consisting of a polymer composition, such as a non-crosslinkable, crosslinkable or crosslinked rubber composition.

5. The tire according to claim 1, wherein the crown reinforcement comprises at least one layer of circumferential reinforcing elements between two working crown layers.

6. The tire according to claim 5, wherein the reinforcing elements of said at least one layer of circumferential reinforcing elements are metal reinforcing elements that have a secant modulus at 0.7% elongation of between 10 and 120 GPa and a maximum tangent modulus of less than 150 GPa.

7. The tire according to claim 1, wherein the crown reinforcement further includes a triangulation layer formed of metal reinforcing elements that form angles of more than 50° in absolute terms with the circumferential direction.

8. The tire according to claim 1, wherein the metal reinforcing elements of at least one layer of the carcass reinforcement are cords comprising at least two layers and wherein at least one inner layer is sheathed with a layer consisting of a polymer composition, such as a non-crosslinkable, crosslinkable or crosslinked rubber composition based on at least one diene elastomer.

* * * * *